Patented July 10, 1923.

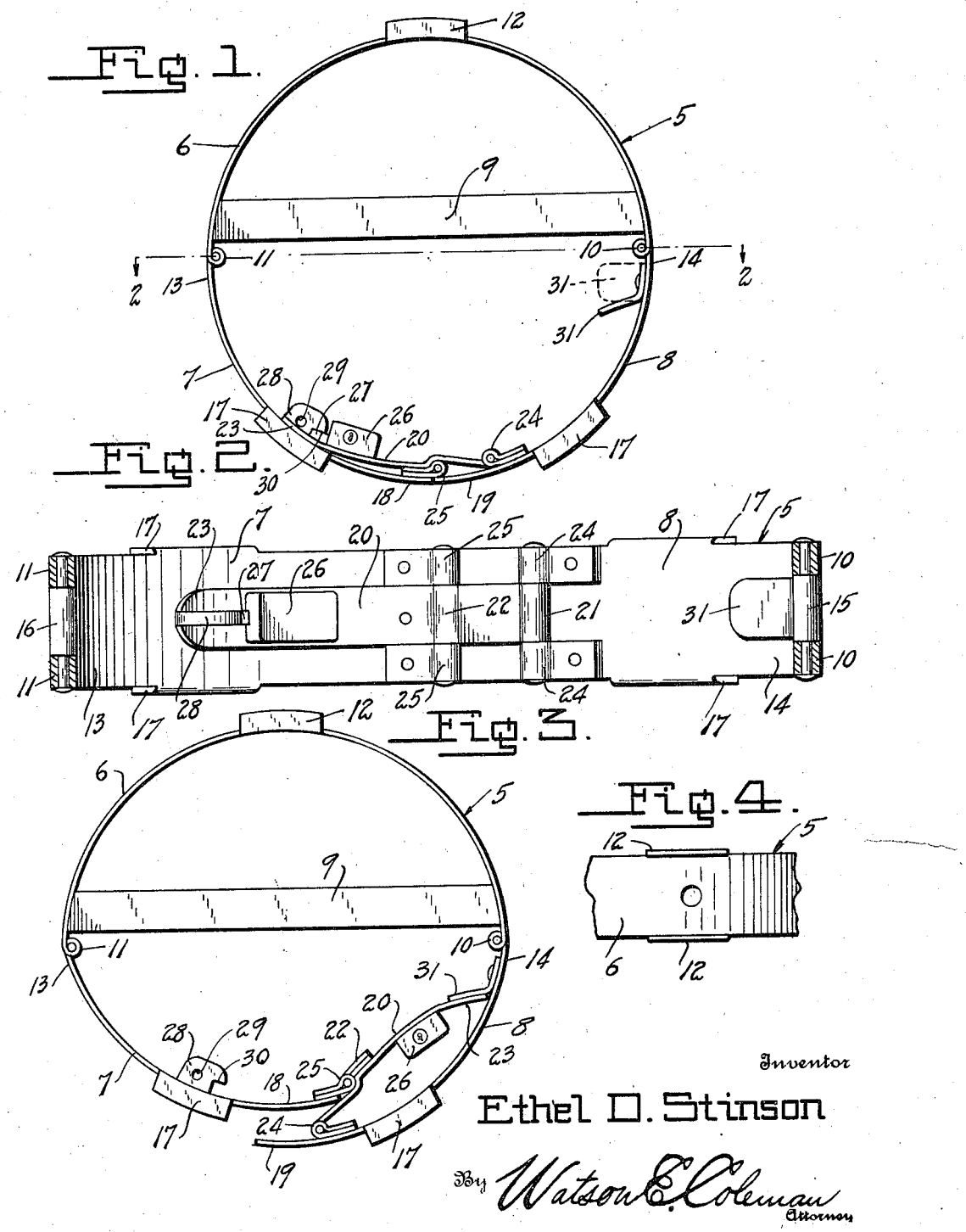

1,461,503

UNITED STATES PATENT OFFICE.

ETHEL D. STINSON, OF BISBEE, ARIZONA.

TIRE CARRIER.

Application filed April 22, 1922. Serial No. 555,984.

*To all whom it may concern:*

Be it known that I, ETHEL D. STINSON, a citizen of the United States, residing at Bisbee, in the county of Cochise and State of Arizona, have invented certain new and useful Improvements in Tire Carriers, of which the following is a specification, reference being had to the accompanying drawings.

This invention relates to tire carriers, and has for its object to provide a carrier arranged to support one or more tire rims and tires upon an automobile.

It is also an object of the invention to provide a carrier of this character wherein the tire can be carried independently of the tire rim, in view of the holding means of the carrier.

It is also an object of the invention to provide a tire carrier including a plurality of sections arranged to form a rim, an operating lever being connected to two of said sections for retracting the rim to permit removal of the tire, and for holding the separable ends of the rim closed after the tire is applied.

It is another object of the invention to provide a carrier of this character wherein a tire or a tire and a tire rim may be readily removed and applied by retraction of the rim through the medium of a lever hinged to the separable ends of the rim.

It is a still further object of the invention to provide a carrier of this character comprising a plurality of hinged sections cooperating to produce a rim, the confronting ends of two of the sections having a lever pivoted thereto for connecting said ends to each other, the lever being provided with means for locking the same to one of said sections to hold the rim closed.

With these and other objects in view, the invention consists in the improved construction and arrangement of parts, to be hereinafter more particularly described, fully claimed and illustrated in the accompanying drawings, in which:—

Figure 1 is a view in elevation of a tire carrier constructed in accordance with an embodiment of the invention, the carrier being shown in its closed position;

Figure 2 is a section taken on the line 2—2 of Figure 1;

Figure 3 is a view in elevation showing the carrier in its open position; and

Figure 4 is a fragmentary plan of the outer face of the carrier.

Referring to the drawings, 5 designates a carrier comprising a plurality of rim sections 6, 7 and 8, the section 6 being relatively large, said section forming the top or upper portion of the carrier. A brace 9 is secured at its ends to the ends of the section 6, the brace being provided with suitable means for connecting the carrier to an automobile.

The ends of the section 6 are provided with extensions which are formed into hinged knuckles 10 and 11, and projecting from the top of the section 6 is a pair of spaced lugs 12, said lugs being formed integral with the section 6 and serve as retaining means for the tire or for the tire and tire rim.

The end portion 13 of the section 7 and the end portion 14 of the section 8 are provided with extensions 15 and 16 which are formed into knuckles, the knuckle 16 being adapted to register with the knuckle 11, while the knuckle 15 is adapted to register with the knuckle 10, a pintle being passed through said registering knuckles. By this means the three sections cooperate to provide a rim corresponding in diameter to the diameter of a tire rim and tire. Each of the sections 7 and 8 is provided with a pair of spaced lugs 17 which project outwardly from the edges of the sections and cooperate with the lugs 12 to hold a tire or tire rim on the carrier.

The end 18 of the section 7 and end 19 of the section 8 form the ends of the carrier. In order to permit the application of a tire to the carrier, an operating lever 20 is provided, said lever having a knuckle 21 formed on one end thereof and a knuckle 22 formed inwardly of the knuckle 21. The opposite end 23 of the lever is bifurcated, the purpose of which will be hereinafter described. The knuckle 21 of the lever is intended to engage a pair of knuckles 24 carried by the end portion 19 of the section 8 inwardly of the extremity of said end portion, while the knuckle 22 of the lever is connected to knuckles 25 formed on the extremity of the end portion 18 of the section 7. By this means, the end portions 18 and 19 or ends of the carrier are connected to each other and at the same time the lever serves as means holding the carrier closed.

To lock the carrier in its closed position, a lock 26 is provided, said lock including the usual locking bolt 27 which extends toward the bifurcated end of the handle, and over the bight portion of the bifurcation. Carried by the section 7 is a keeper 28, said keeper having an opening 29. The keeper is intended, when the carrier is closed, to be disposed within the bifurcated end of the lever so that the lip 30 of the keeper is within the path of movement of the locking bolt 27. Upon operation of the lock, the bolt engages the lip 30 thereby preventing movement of the lever and locking the tires on the carrier. If desired, the lock 26 can be eliminated and the conventional form of padlock used, the padlock being passed through the opening 29 of the keeper.

In the operation of the device, when it is desired to apply or remove the tire, the lever is unlocked and moved toward the section 8, thereby causing the end portions 18 and 19 to overlap and retract the carrier, so that the tires may be readily removed. In order to hold the carrier in its retracted position, a keeper 31 is pivoted to the end portion 14 of the section 8, said keeper being rotatable so as to be swung into engagement with the bifurcated end of the lever after retraction of the sections 7 and 8.

An important feature of this carrier is that the sectional rim is made relatively wide, no channel being provided in the rim, so that it is not only possible for it to hold a rim on which a tire is mounted, but the tire casing without the rim. The rim and the tire in every case is prevented from disengagement through the medium of the lugs 17 and 12, the retraction of the sections permitting the tire and rim to readily move over the lugs.

From the foregoing it will be readily seen that this invention provides a novel form of tire carrier capable of being used in connection with any of the conventional forms of tire carriers or brackets, and wherein either a tire rim or a tire rim and tire may be easily applied and removed from the carrier, and also properly locked against theft, in view of the novel locking mechanism carried by the lever, and all of these features are possessed by a device which is simple in construction and easily operated.

What is claimed is—:

1. A tire carrier comprising a rim provided with separable confronting ends, a lever pivotally connected at spaced points to said ends and designed to cause said ends to abut and to overlap in the expansion and contraction of said rim, one of said ends being provided with a keeper and the lever being provided with a lock engageable with said keeper, the other end being provided with a swinging latch designed to engage the relatively free end of the lever to hold the same in the contracted condition of the carrier.

2. A tire carrier comprising a rim provided with ends adapted to be moved into overlapping and abutting relation to each other in contracting and expanding the device, an operating lever pivotally connected to said ends at spaced points along the lever, a lock carried by said lever, said lever being formed with a longitudinally bifurcated free end, a keeper carried by one of said ends and designed for insertion in the bifurcation of said lever, for the purpose specified, and a laterally swinging latch carried by the other end of the rim and designed for engagement with the free end of the lever in the contracted position of the rim.

In testimony whereof I hereunto affix my signature.

ETHEL D. STINSON.